United States Patent [19]
Ensinger

[11] 3,858,601
[45] Jan. 7, 1975

[54] MOVABLE APPLIANCE ASSEMBLY AND GAS CUT-OFF VALVE

[75] Inventor: Chester B. Ensinger, Mobile, Ala.

[73] Assignee: Roto-Swivel Corporation, Inc., Burbank, Calif.

[22] Filed: Feb. 1, 1973

[21] Appl. No.: 328,716

[52] U.S. Cl. ............... 137/374, 285/114, 285/168, 285/269, 137/75, 137/615
[51] Int. Cl. ............................................. F16l 35/00
[58] Field of Search ............... 137/374, 615, 74, 75; 285/166, 167, 168, 268, 269, 114

[56] References Cited
UNITED STATES PATENTS

| | | | |
|---|---|---|---|
| 325,590 | 9/1895 | Cosgrove et al. | 137/75 |
| 422,583 | 3/1890 | Finch et al. | 137/75 |
| 800,740 | 10/1905 | Hoelder et al. | 137/75 |
| 875,264 | 12/1907 | Hoelder et al. | 137/75 |
| 1,393,987 | 10/1921 | Wampler | 285/168 |
| 1,920,545 | 8/1933 | Bard | 285/269 |
| 1,928,279 | 9/1933 | Bard | 285/269 |
| 3,186,737 | 6/1965 | Brundage | 285/168 X |
| 3,281,080 | 10/1966 | Hogg | 137/615 X |

*Primary Examiner*—Henry T. Klinksiek
*Attorney, Agent, or Firm*—Thomas D. Linton, Jr.

[57] ABSTRACT

An improved appliance gas service connector and gas cutoff valve is provided which includes a pipeline and rotational angular coupling combination in conjunction with an improved and unique gas cut-off valve for connecting an appliance to the gas main. The combination permits the appliance to be moved out from or in toward the wall for cleaning purposes without any danger of rupturing the line which connects the appliance to the mains. A gas cut-off valve is included which automatically cuts off the gas when the ambient temperature is excessive (370° approx.) which may indicate fire.

5 Claims, 6 Drawing Figures

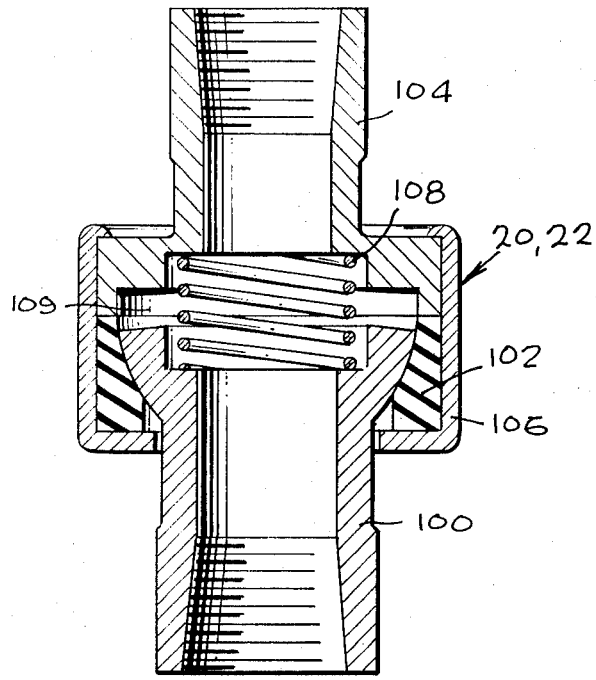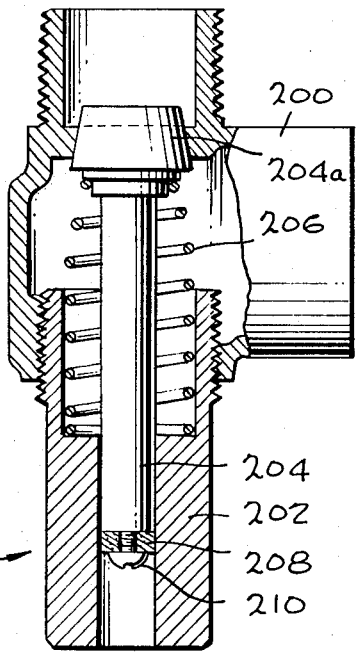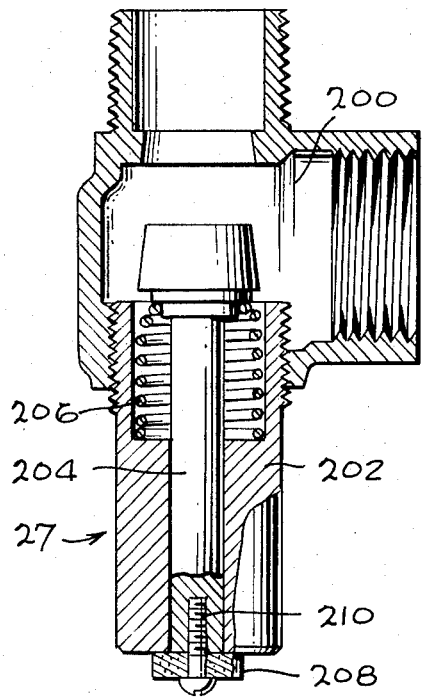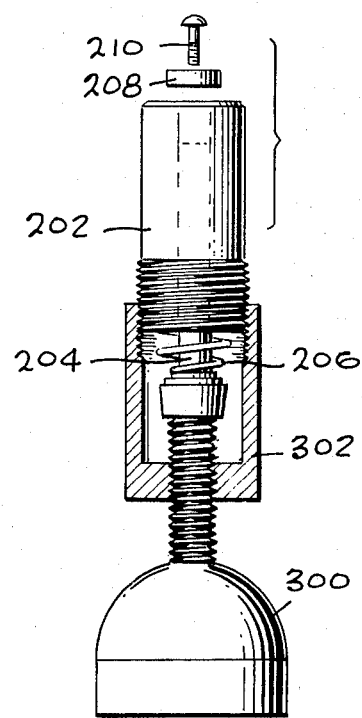

MOVABLE APPLIANCE ASSEMBLY AND GAS CUT-OFF VALVE

BACKGROUND OF THE INVENTION

The gas store in the home, restaurant, or other establishment is usually a free standing piece of equipment, and it cannot normally be moved because of the rigid pipeline supplying the gas to the appliance. Because of this, there is a tendency for dirt and debris to accumulate around and behind the appliance year after year, causing a health, fire and safety hazard. The present invention provides limited mobility to a connected gas appliance for the purpose of cleaning below and behind the appliance.

For example, usual commercial casters and/or rollers may be installed under the restaurant or domestic gas range, so as to render the range freely movable toward and away from the wall. When the range is coupled to the gas main through the folding assembly of the present invention, it may be freely moved out from the wall for cleaning purposes without any fear of rupturing the gas service connection or shutting off the gas.

A feature of the invention is the inclusion in the folding assembly of a cut-off valve which automatically serves to cut off the gas flow should the ambient temperature rise above a pre-established temperature threshold.

The use of the coupling combination of the present invention, in the embodiment to be described, incorporates an angulation feature to compensate for irregularities in the floor surface. The assembly is simple in its construction, and is capable of trouble-free operation for many years.

BRIEF DESCRIPTION OF THE DRAWINGS

FIG. 3 is a sectional view of a rotational/angular coupling which is used in the folding assembly of FIG. 1, and which provides angulation and 360° of rotation for the purpose of compensating for floor irregularities and providing the coupling flexibility necessary;

FIG. 4 is a section of an automatic gas shut-off valve which is also incorporated in folding assembly of FIGS. 1 and 2;

FIG. 5 is a sectional representation of the gas cut-off valve of FIG. 4 in an actuated position; and FIG. 6 is a representation, partly in section, showing the manner in which the gas cut-off valve may be assembled.

DETAILED DESCRIPTION OF THE ILLUSTRATED EMBODIMENT

Figure 1:
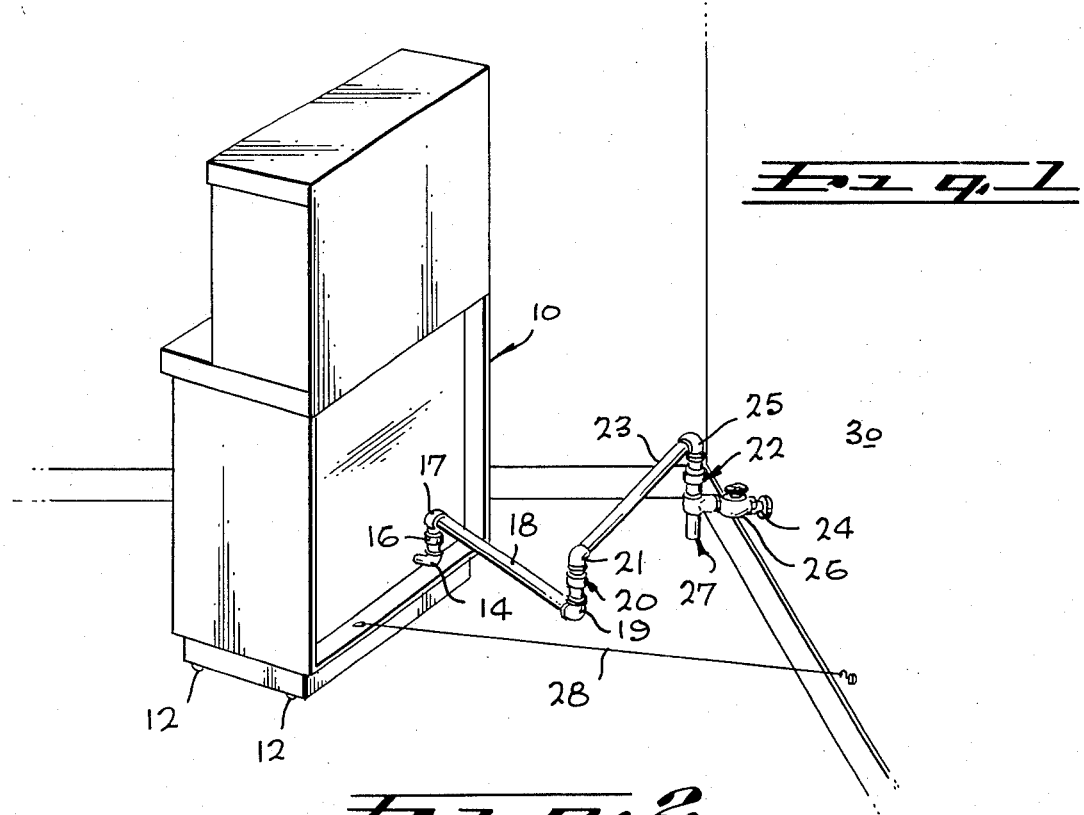
FIG. 1 is a perspective representation of a gas stove appliance showing folding assembly which, in the practice of the illustrated embodiment of the present invention, connects the stove to the gas main.
Figure 2:
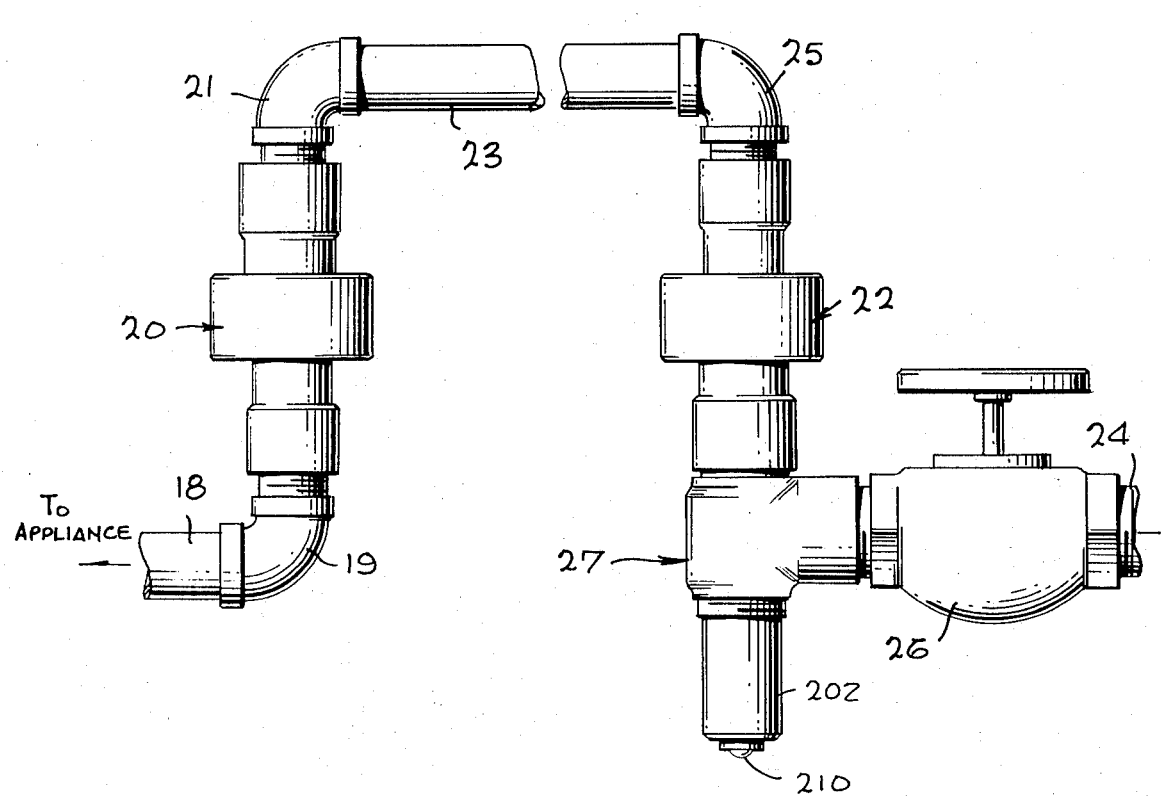
FIG. 2 is an enlarged representation of a portion of the folding assembly of FIG. 1.

As shown in FIG. 1, a gas stove 10 is supported on usual commercial rollers 12. These rollers, for example, may be of the type described in U.S. Pat. No. 3,061,327. When the rollers are placed under the appliance 10, they permit the appliance to be moved away from the wall of the restaurant for cleaning purposes, as described above.

In the practice of the invention, the gas intake 14 of the appliance is coupled through a first rotational/angular coupling 16 and through an L fitting 17 to a first pipeline 18. The pipeline 18 is coupled through a second L fitting 19, through a second rotatable swivel coupling 20, and through a further L fitting 21 to a second pipeline 23.

The pipeline 23, in turn, is coupled through an L fitting 25, through a rotatable swivel coupling 22, and through an automatic gas shut-off valve 27 to the gas outlet 24. The gas outlet 24 is coupled through a usual pipeline (not shown) to the gas main. A wall shut-off valve 26 may be included in the outlet 24.

A safety cable, or chain 28 may be connected to the rear of the appliance and to the floor or wall 30 so as to limit the extent to which the appliance may be pulled out from the wall. This cable prevents excessive movement of the appliances 10 which could result in rupturing the folding assembly.

The rotational/angular coupling 16, 20 and 22 may each be constructed in the manner shown in FIG. 3. Each coupling may include, for example, a first tubular section 100 having a spherical-shaped surface at one end which is held in universal coupling engagement with spherical-shaped socket 102. The fitting also includes a second tubular section 104 which is held in axially aligned relationship with the first member 100 by means, for example, of a casing 106, the casing surrounding the socket 102 and being crimped over the section 104. An internal spring 108 is interposed between the two sections 100 and 104, and it serves to bias the spherical surface of the section 100 into sliding engagement with the spherical surface of the socket 102. The section 104 is relieved at 109 to allow the spherical surface of section 100 to oscillate therein to limit angulation as desired from maximum to 0°.

The resulting fitting is one which permits independent 360° rotation of the sections 100 and 104 about the longitudinal axis of the fitting, and which also permits a degree of angulation between the sections to compensate for irregularities of the floor surface. The couplings 16, 20 and 22, and the safety cable 28 limit movement of the entire extendible gas service connector in all directions.

The gas cut-off valve 27, as shown in FIG. 4, includes an L-shaped fitting 200 which has an additional threaded aperture therein to receive the casing 202 of a valve operating mechanism. The valve operating mechanism includes a plunger 204 which is biased by a spring 206, and which is normally held in the position shown in FIG. 4 against the bias of the spring 206 by a washer 208. The washer 208 is formed, for example, of 60–40 solder which melts at 370° Fahrenheit. The washer 208 bears against the end of the casing 202, and is held on the plunger 204 by means of a screw 210.

As shown in FIG. 5, when the ambient temperature rises above the melting point of the solder 208, the plunger 204 releases, and the spring 206 causes the head 204a of the plunger to seat in the casing 200 and to form a cut-off for the valve.

The plunger 204 may be mounted in place in the valve mechanism by means, for example, of a loading jig 300. The loading jig includes a tubular member 302 which is threaded to the casing 202, and the plunger is forced back against the spring bias of spring 206 by threading the jig 300 into the tubular member 302. When the plunger has been moved back against the bias of the spring 206, the screw 210 and the solder washer 208 may be mounted in the assembly.

The invention provides, therefore, an improved pipe and fitting combination for connecting an appliance to a gas outlet, and which permits the appliance safely and easily to be moved out from the wall for cleaning purposes.

While a particular embodiment of the invention has been shown and described, modifications may be made, and it is intended in the following claims to cover all modifications which fall within the true spirit and scope of the invention.

What is claimed is:

1. An extendible gas service connector for connecting a gas-operated appliance with a gas main pipeline, said appliance being supported by roller means for rendering the appliance freely movable, said extendible gas service connector including:
   a pair of rigid pipelines;
   a first freely rotatable (rotatable/angular) uiversal coupling at one end of said pipelines said coupling providing for free independent 360° rotation about the longitudinal axis of said coupling;
   a second freely rotatable universal coupling at one end of the other of said pipelines;
   a third freely rotatable universal coupling intercoupling the other ends of said pipelines; and
   restraining means for limiting movement of said extendible gas service connector in three dimensions.

2. An extendible gas service connector in accordance with claim 1 wherein each said freely rotatable universal coupling includes;
   a first tubular member having a spherical-shaped surface at one end thereof;
   a socket member having a spherically-shaped surface coaxially positioned with respect to said first member;
   a second tubular member axially disposed with respect to said first member and said socket member;
   a compression spring interposed between said first member and said second member and in axial alignment therewith for biasing the surface of said first member against the surface of said socket member;
   a spacer member of said second tubular member abutting said socket member for limiting angulation of said universal coupling from maximum to zero degrees angulation; and
   a casing holding said first and said second members and said socket member in a coupled relationship for providing for a freely rotatable universal movement.

3. An extendible gas service connector in accordance with claim 2 wherein said restraining means includes a safety cable for connecting the appliznce with an adjacent wall or floor for limiting the extent to which the appliance may be moved parallel of perpendicular to said adjacent wall; and
   a spacer member inserted between said first tubular member and said second tubular member of said universal coupling for limiting angulation of said coupling and thereby limiting verticle movement of said appliance.

4. A rotatable rotational/angular coupling assembly comprising:
   a first tubular member having a spherical-shaped surface at one end thereof;
   a socket member having a spherically-shaped surface coaxially positioned with respect to said first member; receiving said spherical shaped surface of said first member;
   a second tubular member axially disposed with respect to said first tubular member and said socket member, said second tubular member having a spacer member abutting said socket member;
   a compression spring interposed between said first member and said second member and in axial alignment therewith biasing the spherical-shaped surface of said first member against the surface of said socket member;
   said spacer member having means for limiting angulation of said coupling from maximum to zero degrees angulation; and
   a casing holding said first and said second members and said socket member in a coupled relationship for providing for a freely rotatable rotational/angular movement.

5. An extendible gas service connector for connecting a gas-operated appliance with a gas main pipe line, said appliance being supported by roller means for rendering the appliance freely movable, said extendible gas service connector including:
   a gas intake pipe to said appliance;
   a first freely rotable rotational/angular coupling connected to said intake pipe, said coupling providing for free independent 360° rotation about the longitudinal axis of said coupling;
   a first L fitting connected to said first coupling;
   a first pipeline section of straight pipe having a suitable predetermined length, said first pipeline section being connected to said first L fitting;
   a second L fitting, said second L fitting being connected to said first pipeline section;
   a second freely rotable rotational/angular coupling, said second rotable coupling being connected to said second L fitting;
   a third L fitting connected to said second coupling;
   a second pipeline section of straight pipe having a suitable predetermined length, said second pipeline section having one end connected to said third L fitting;
   a fourth L fitting, said fourth L fitting being connected to the other end of said second pipeline section;
   a third freely rotable rotational/angular coupling, said third rotable coupling being connected to said fourth L fitting;
   a gas cut-off valve, said cut-off valve automatically operating to cut off gas flow through said extendible gas service connector when the ambient temperature rises above a certain predetermined amount, said gas cut-off valve being connected to said third freely rotable coupling;
   a manually operable gas cut-off valve, said manually operable gas cut-off valve being connected to said automatically operated gas cut-off valve;
   a gas pipeline for connecting said manually operable gas cut-off valve with a gas main pipeline; and
   restraining means for limiting movement of said extendible gas service connector in three dimensions.

* * * * *